May 16, 1939.  J. G. SOLA  2,158,733
ELECTRICAL HEATING MECHANISM
Filed Sept. 13, 1935
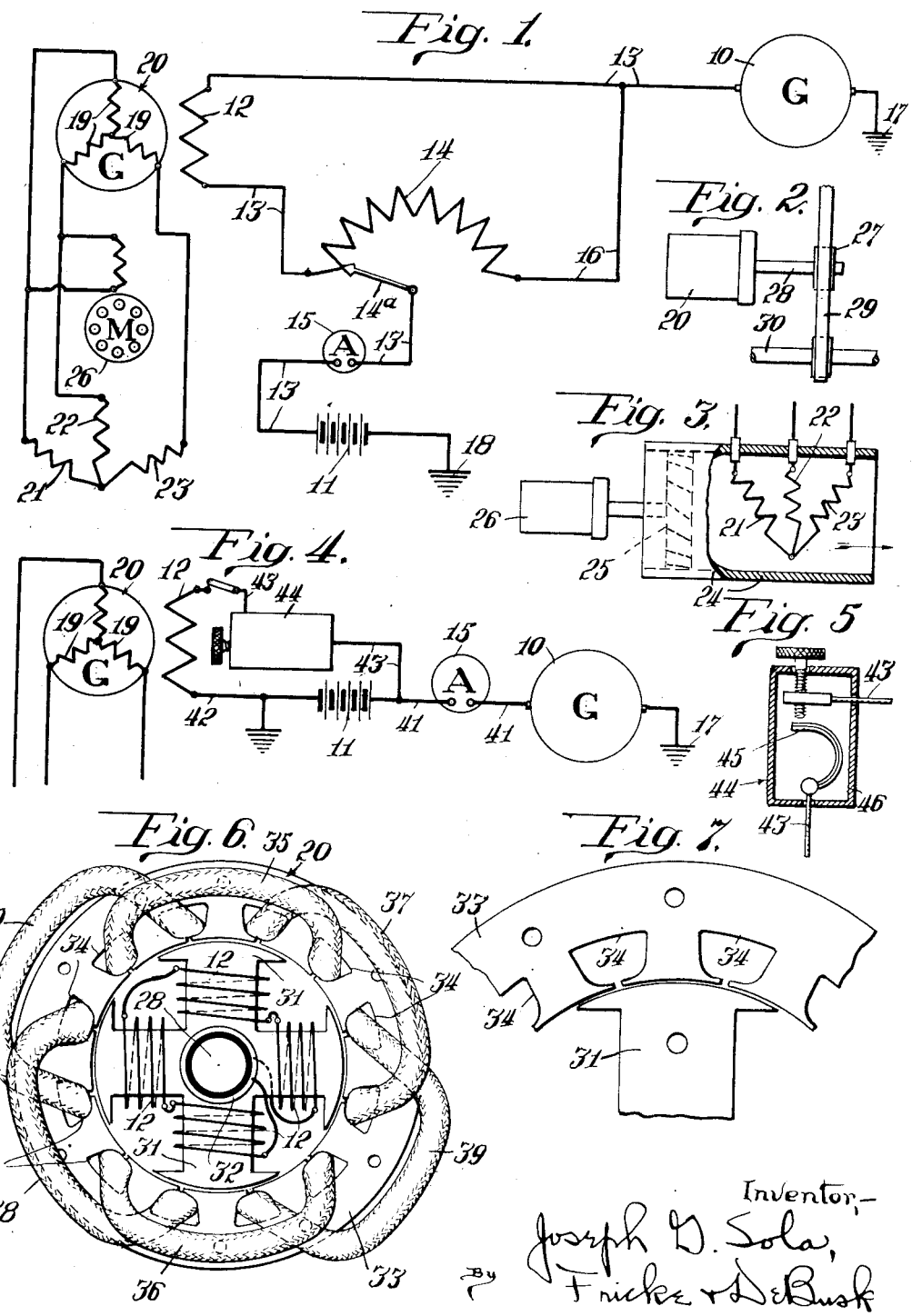
Inventor,-
Joseph G. Sola,
By Fricke & DeBusk
Attorneys.

Patented May 16, 1939

2,158,733

UNITED STATES PATENT OFFICE 2,158,733

ELECTRICAL HEATING MECHANISM

Joseph G. Sola, Oak Park, Ill.

Application September 13, 1935, Serial No. 40,454

2 Claims. (Cl. 171—313)

My invention relates to electrical heating mechanisms of the type adapted for use advantageously as an automobile heater or the like, and it has for its object the provision of a new and improved form and arrangement of parts by which an improved heating effect shall be produced by a mechanism of a size and weight suitable for use under the hood of an automobile. This application is being filed as a continuation in part of my prior application Serial No. 749,570 filed on October 23, 1934, which has matured into Patent 2,088,617, dated August 3, 1937.

It is one of the objects of my invention to provide an improved electrical heater mechanism capable of effective use in connection with the usual generator and storage battery of an automobile, being so arranged that its use in connection with the generator and storage battery shall have no detrimental effect on the operation of the generator and battery in connection with the usual electrical equipment of the car. It is another object of my invention to provide an improved arrangement of control means by which the heating mechanism may be thrown into and out of effective operation as may be desired.

To these ends, it is one of the objects of my invention to provide an improved alternator having a field capable of being energized effectively by a small direct current and so arranged as to be effective for producing the desired output when driven at a predetermined speed of rotation and as to be effective for keeping the output down to approximately the same value when driven at a greatly increased speed of rotation whereby there shall be no danger of the production of a destructive overload at any speed of rotation, either with respect to the alternator or with respect to the external circuit and its connections. It is one of the objects of my invention to provide an improved arrangement comprising a small polyphase alternator having its field energized from the usual charging generator of an automobile, either directly from a generator or from the storage battery of the car having its rotor element driven by power from the driving motor of the car through the medium of some part driven through a chain of mechanism directly from the motor or through the medium of some part actuated by the forward movement of the car, the alternator being so constructed that as the speed of rotation increases with increased speed of driving the automobile beyond the arbitrary selected normal the increased reactance of the armature keeps the output of the alternator substantially uniform at approximately the value established at said selected normal speed of operation.

It is another object of my invention to improve mechanisms of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,

Fig. 1 is a diagrammatic view of the preferred embodiment of my invention as applied to an automobile;

Fig. 2 is a view also more or less diagrammatic showing the preferred means for driving the alternator;

Fig. 3 is a diagrammatic view showing the arrangement of the fan and motor of my improved system;

Fig. 4 is a view similar to a portion of Fig. 1 but showing a modified form of feed to the field coil of the alternator;

Fig. 5 is an enlarged detail showing of the form of thermostatic switch used in the mechanism of Fig. 4;

Fig. 6 is a more or less diagrammatic end view of my improved alternator; and

Fig. 7 is an enlarged detail view of fragmentary portions of the cores of the rotor and stator elements of my improved alternator.

While my invention is provided primarily for use in connection with automobiles, or trucks, or buses, or other motor vehicles, such as airplanes, for example, it is to be understood that my invention is capable of use to advantage in connection with vehicles which are propelled by a draw bar or the like, such as railway cars, for example. In the use of my invention in connection with motor vehicles, I prefer to have the driven parts actuated by power directly from the motor, while in a vehicle of a trailer type the driven parts would preferably be actuated by power from one or more of the supporting wheels.

In the arrangement shown in Fig. 1, 10 indicates the ordinary charging generator of an automobile adapted to produce direct current for charging the usual storage battery 11. In the arrangement shown, the field coil or coils of a polyphase alternator mounted preferably underneath the hood of the car are represented by the numeral 12, such coil or coils being connected by a lead 13 between the generator 10 and the battery 11, such lead 13 having a rheostat 14 and an ammeter 15 connected in series therein between the coil 12 and the battery 11. A lead 16 is also provided between the battery and the generator in parallel with the field coil 12. The charging generator 10 is grounded to the frame of the car at 17 and the storage battery is grounded to the frame of the car at 18. The arrangement is such that when the arm 14a of the rheostat is standing in the position as shown in Fig. 1 substantially the entire output from the generator 10 passes through the field coil means 12. When the arm 14a is given an intermediate position along the resistance of the rheostat, the current from the generator 10 is divided between the lead 13 through the field coil means 12 and the lead 16 in shunt relation to said field coil means. When the arm 14a is swung to the limit of its motion in clockwise direction in said Fig. 1, the field coil means 12 is effectively shunted out of connection with the generator. In this way, the strength of the current passing through the field coil means is very readily controlled.

The armature coils 19 of the alternator 20 comprise a distinct departure from the usual construction of corresponding parts in arrangements heretofore employed. In ordinary practice, an alternating current generator is driven at approximately a normal predetermined speed, and the generator is designed with reference to operation at approximately such predetermined normal speed. My alternator 20, however, is to be driven at a speed proportional to the forward movement of the vehicle upon which the alternator is mounted. In view of this condition, I have departed from the ordinary practice so as to provide that when the speed of rotation of the alternator exceeds a certain predetermined value the increased reactance of the armature upon such increased speed rotation of the alternator absorbs the potential sufficiently or otherwise affects the operation in such a way as to prevent the output of the alternator from increasing to any substantial extent. The number of the turns in the coils 19 and other elements of the design of the alternator are kept such that upon an increase from the normal to very high speed rotation of the alternator the output is kept substantially constant rather than being greatly increased as would be the result if the alternator were of the usual design.

For utilizing the output of the alternator 20 for producing heat, I have provided a heating unit comprising resistance heater elements 21, 22 and 23 which in the construction shown are star connected. The resistance heater elements 21, 22 and 23 in the construction shown in Fig. 3 are located within a housing 24 in which there is located a fan or blower 25 of any approved type by the rotation of which a stream of air is forced past the heater elements for delivery to the body of the car as indicated by the arrow in Fig. 3.

For driving the fan or blower 25, I have provided an induction motor 26. With this arrangement, the speed at which the fan is driven is proportional to the effective output of the alternator, serving when the output increases to increase the delivery of air past the heating elements in the same proportion, whereby the heating elements are kept at substantially even temperature without danger of being burned out. The motor 26 is very small and consumes a very small amount of current, leaving substantially the entire output of the alternator 20 for delivery to the resistance elements 21, 22 and 23 for the production of heat.

In Fig. 2, I have shown the means for driving the alternator 20, comprising a driving pulley 27 mounted upon the rotor shaft 28 of the alternator and engaging the usual fan belt 29 of the automobile driven by the timing shaft 30 or other moving part of the automobile.

By the use of my improved apparatus, the ordinary generator 10 of an automobile delivers current to the field coil 12 of the alternator 20 which is actuated by connection with any suitable driven part of the car. I have found in practice that the mechanical energy required for driving the alternator 20 is very small, and that the electrical energy consumed in the field coil 12 is so small as to have no material effect upon the battery 11 which operates in its usual manner and at its usual efficiency without any substantial added likelihood of becoming unduly discharged in the normal operation of the car. I have found in practice that under such conditions of use sufficient heat is delivered from the housing 24 for maintaining the desired temperature in a closed automobile even on a cold and windy day. When the speed of movement of the automobile is increased beyond a predetermined normal, the reactance of the armature likewise increases, serving to keep down the output from the alternator. If, however, there is a slight increase in the output from the alternator, such increase is immediately responsive for driving the single-phase induction motor 26 at increased speed, serving to deliver a greater quantity of air through the heater unit and serving thus to keep down the temperature of the resistance wire of the heating element.

In the form of alternator shown in my drawing as being typical of my invention and as being merely illustrative of one operative form of my improved arrangement, I have employed a revolving field and stationary armature. In this arrangement, four field coils 12 are mounted upon the radial arms of a core structure 31 supported and rotated through the medium of the shaft 28, said coils 12 being reversely connected in series with each other so as to provide alternate north and south poles circumferentially about the core structure, the direct current from the leads 13 being fed to the coils through the medium of the usual slip rings 32, only one of which is shown by the drawing. The core 33 for the armature is in the usual ring form provided with twelve inwardly opening notches 34 for the reception of six coils 35, 36, 37, 38, 39 and 40 connected in pairs for delivering three-phase current, the oppositely disposed coils of each pair being connected in series in cooperative relation. In the arrangement shown, each of the coils of the armature comprises a very considerably greater number of turns than are used in accordance with standard practice in alternators designed for producing a maximum output for use in connection with a non-reactive external load circuit, whereby the self-inductance of the alternator and the reactance effect upon the current set up therein are very greatly increased. In the arrangement as shown in my drawing, I have employed substantially double the number of turns in each of the six coil sections for providing the desired output for use in my improved system as compared with the number of turns which would be employed in each of the six coil sections of a three-phase alternator built in accordance with standard practice for producing a maximum output. As great a number of turns are used in the armature coils as is consistent with fairly efficient operation at the arbitrarily selected normal speed of driving the automobile upon which the alternator is mounted and to which it is geared, with the reactance effect of the armature at such normal operation comparatively high. It is thus clear that as the speed of driving is increased and the frequency of the alternator is thus correspondingly increased above the selected normal, the choking effect of the alternator coils builds up very rapidly, serving to prevent any substantial increase in the output of the alternator.

The maintenance of the output substantially constant upon increased speed of rotation of the rotor beyond the selected normal speed is due to the increase in the self-inductance in the armature coils. The number of turns in the armature of my improved alternator and the resultant self-inductance therein at the selected normal speed of rotation are such that the induced current flowing through the armature coils at such normal speed of rotation barely has time to build up to its maximum value or to a close approach to such maximum value in the successive periods during which the number of lines of force cut by the successive armature coils is successively increasing and then decreasing. It is clear accordingly that when the frequency is greatly increased the time constant of the armature circuits with their comparatively great number of turns becomes a controlling factor. As the frequency is increased upon an increase in the speed of driving the automobile beyond the selected normal speed, the increased number of lines of force cut by the armature turns due to the increased speed of rotation of the field tends to increase the output, while at the same time the decreased proportion of current having time to establish itself in the armature coils tends to decrease the output. I have found that by the use of my improved arrangement the tendency for the increase in the output can be kept substantially balanced by the tendency for a decrease in the output, with the result that the output remains substantially fixed at the value established at the selected normal speed of rotation.

In the arrangement shown in Figs. 4 and 5, the current for the field coil 12 of the alternator is taken directly from the battery 11 rather than from the generator 10. In this arrangement, the generator 10 and ammeter 15 are connected directly with the battery 11 by interrupted leads 41 in the usual well understood manner. The field coil 12 is then connected directly with the battery by leads 42 and 43, one of such leads having a thermostatically operated switch 44 of any approved type connected therein for controlling the feed of current to the field coil. In the arrangement shown, the switch 44 comprises a heat-affected element 45 of any approved type mounted in a housing member 46 in such relation that the lead 43 is completed through the switch device when the temperature of the element 45 reaches a predetermined minimum. By this arrangement, the alternator 20 is operated at full field strength during intermittent periods rather than at partial field strength at longer periods.

By the use of my improved arrangement as shown in Fig. 1, heat is available immediately upon the start of the operation of the motor of the automobile without the necessity for any delay for the heating of the water in the radiator or for any other purpose. The mechanism is very readily controlled, is simple in operation, is easily installed, is not likely to get out of order, can be operated without any danger whatever, and is economical in operation.

I claim:

1. In an electrical heating mechanism for a vehicle, the combination of a polyphase alternator of the type having revolving windings and arranged for a high internal reactance effect by reason of the number of the turns in the armature coils being substantially greater than the number at which a maximum output of the alternator is procured, a direct current generator, connections between said direct current generator and the field coils of said alternator for energizing said field coils, means for driving said alternator and said direct current generator at varying speeds proportional to the speed of movement of the vehicle, and resistance heater elements connected with said armature coils, the arrangement being such that the increase in the internal reactance of the armature of the alternator serves to keep the output of the alternator to the heater elements substantially uniform as the speed of rotation of the alternator increases.

2. In an electrical heating means for a vehicle, the combination of a polyphase alternator of the type having revolving windings and having in its armature substantially double the number of turns ordinarily employed in the armature of an alternator designed for maximum output, means for driving the alternator at varying speeds proportionately to the speed of movement of the vehicle, means for energizing the field coils of said alternator substantially uniformly at the various speeds of driving, and resistance heater means connected in the output circuit of said alternator, the arrangement being such that substantially the desired full load output is produced by the alternator at a predetermined moderate speed of driving and that as the vehicle is driven at higher speeds an increased internal reactance effect absorbs a substantial portion of the developed electro-motive force so as to keep the output of the alternator substantially uniform.

JOSEPH G. SOLA.